United States Patent [19]

Odaka

[11] 4,456,905
[45] Jun. 26, 1984

[54] METHOD AND APPARATUS FOR ENCODING BINARY DATA

[75] Inventor: Kentaro Odaka, Kawasaki, Japan

[73] Assignee: Sony Corporation, Tokyo, Japan

[21] Appl. No.: 346,915

[22] Filed: Feb. 8, 1982

[30] Foreign Application Priority Data

Feb. 9, 1981 [JP] Japan .................................. 56-17734

[51] Int. Cl.³ ............................................ H03K 13/24
[52] U.S. Cl. ................................ 340/347 DD; 360/40
[58] Field of Search ................... 340/347 DD; 360/39, 360/40, 41, 42, 43; 371/55

[56] References Cited

U.S. PATENT DOCUMENTS 3,631,471 12/1971 Griffiths ...................... 340/347 DD
3,810,111 5/1974 Patel ............................ 340/347 DD
4,343,023 8/1982 Nishimura ............................ 360/40

*Primary Examiner*—C. D. Miller
*Attorney, Agent, or Firm*—Lewis H. Eslinger; Alvin Sinderbrand

[57] ABSTRACT

The present invention is directed to an improved method and apparatus for encoding binary data by which an improved sequence of encoded binary digits suitable for the NRZI modulation to produce a recording signal is obtained. The improved sequence of encoded binary digits obtained according to the invention consists of a plurality of binary digit blocks, each of which is formed with a predetermined number of the encoded binary digits obtained from the binary data and plural redundant codes, each of which is inserted between each successive two of the binary digit blocks, and can produce the recording signal forming a rectangular pulse train with the waveform which has the long minimum run length and does not contain the DC component or contains the diminished DC component therein when it is modulated in the NRZI modulation. By use of such a recording signal, high data density recording with a recording signal transmitted without distortions in its waveform can be achieved.

2 Claims, 4 Drawing Figures

METHOD AND APPARATUS FOR ENCODING BINARY DATA

BACKGROUND OF THE INVENTION

This invention relates generally to method and apparatus for encoding binary data used, for example, in the digital signal recording, and more particularly to such method and apparatus by which an improved sequence of encoded binary digits to be modulated in the NRZI modulation is obtained from the binary data.

The digital signal recording utilizing the binary data is made with variations in residual magnetization on a magnetic recording medium, variations in geometrical shape formed on a recording medium shaped in a disc and so on, and has the feature that a great deal of information can be recorded in high density and kept in good preservation. In order to produce the variations in residual magnetization, variations in geometrical shape and so on as mentioned above, it is required to generate a recording signal, for example, a recording current in the form of a rectangular pulse train having the waveform which varies in response to the binary data, and therefore it is achieved to encode the binary data with a predetermined coding system to produce encoded binary digits and then to modulate the encoded binary digits in a predetermined modulation to obtain the recording signal. Various modulation systems have been proposed for the modulation for such a purpose and the NRZI modulation is one of them. In brief, the NRZI modulation is such a modulation system as to invert the level of the recording signal at the binary digit of "1" and not to invert the level of the recording signal at the binary digit "0" to provide with two different levels to the recording signal.

In the waveform of the recording signal obtained by the NRZI modulation or the like, a minimum one of intervals between successive two level inversions is called the minimum run length·Tmin and this exercises an important effect upon recording characteristics. That is, the inversions in magnetization or the variations in geometrical shape are made on the recorded medium in accordance with the level inversions in the recording signal and, in reproducing process, reproduced pulses are obtained in response to reading out of the inversions in magnetization or the variations in geometrical shape, and distortions in the waveform of the reproduced pulses are caused by the mutual interference between successive two of the reproduced pulses and such distortions increase when the interval between successive two level inversions in the waveform of the recording signal is short. The increased distortions in the waveform of the reproduced pulses introduce easily a mistake in conversion of the reproduced pulses to the binary digits. Accordingly, the minimum run length·Tmin is desired to be long.

While a maximum one of the intervals between successive two level inversions in the waveform of the recording signal is called the maximum run length·Tmax and this affects easiness in self-clocking in the reproducing process. That is, since the reproduced pulses are not obtained during a period corresponding to the maximum run length·Tmax, it is impossible to produce a clock signal directry from the reproduced pulses at the period corresponding to the maximum run length·Tmax and the generation of the clock signal is easy to be inaccurate. This results in difficulty in the self-clocking. Accordingly, the maximum run length·Tmax is desired to be relatively short.

Further, when the level of the waveform of the recording signal, which forms the rectangular pulse train taking a positive level and a negative level, is unbalanced toward one of the positive and negative levels during a certain relatively long period, in other words, in case that supposing a minimum pulse width of the positive rectangular pulse is represented with $+1$, a pulse width which is X times as long as the minimum pulse width of the positive rectangular pulse is represented with $+X$, a minimum pulse width of the negative rectangular pulse is represented with $-1$ and a pulse width which is X times as long as the minimum pulse width of the negative rectangular pulse is represented with $-X$, the accumulation of such representations during the certain relatively long period takes a certain positive or negative value, it is true that the waveform of the recording signal contains a DC component in its frequency spectrum. The waveform of the recording signal which contains the DC component such as mentioned above is undesirably distorted in transmission, because the recording signal and reproduced signal are generally transmitted through AC coupling elements. Furthermore, in such a case, even if it is intended to reproduce the same waveform as the original waveform of the recording signal in the reproducing process, it is impossible to recover the DC component which has been omitted at the AC coupling elements. Accordingly, the waveform of the recording signal is desired not to contain the DC component.

In case that the NRZI modulation is adopted, since the level inversions in the waveform of the recording signal are caused at every binary digit of "1" in the encoded binary digits, the minimum run length·Tmin, the maximum run length·Tmax and the matter whether the waveform of the recording signal contains the DC component or not are determined by the manner of appearance of the binary digit of "1" in the encoded binary digits. Various systems for obtaining encoded binary digits to be modulated in the NRZI modulation by means of encoding the binary data have been previously proposed. For example, such a system as to convert every three digits of the binary data to six encoded binary digits as a unit block of the whole encoded binary digits has been already known as a system in which the long minimum run length·Tmin can be obtained. In this system, the minimum run length·Tmin has the period corresponding to one cycle of binary digit and a half of the binary data. However, there is a disadvantage that the waveform of the recording signal formed by modulating in the NRZI modulation the encoded binary digits obtained in accordance with this system contains the DC component. On the other hand, another system which is so designed that the waveform of the recording signal formed by modulating in the NRZI modulation the encoded binary digits obtained thereby does not contains the DC component has been also proposed already. However, in this case, there is also a disadvantage that the minimum run length·Tmin can not be more than the period corresponding to one cycle of binary digit of the binary data.

As mentioned above, none of the previously proposed systems satisfies both requirements that the long minimum run length is to be obtained and the waveform of the recording signal formed by the NRZI modulation is not to contain the DC component. Incidientally, with regard to the maximum run length·Tmax, even if it is relatively long, it is not serious problem, because it is possible to generate accurately the clock pulse by means of use of a phase locked loop (PLL) circuit or the like at a clock generating portion in a reproducing apparatus.

SUMMARY OF THE INVENTION

It is an object of the present invention to provide an improved method and apparatus for encoding binary data to produce a sequence of encoded binary digits suitable for the NRZI modulation.

Another object of the present invention is to provide an improved method and apparatus for encoding binary data which can produce such a sequence of encoded binary digits that a recording signal with the waveform which has the long minimum run length and does not contain the DC component in its frequency spectrum or contains the diminished DC component is obtained when it is modulated in the NRZI modulation.

According to an aspect of the present invention, in the encoding of the binary data to the sequence of encoded binary digits to be modulated in the NRZI modulation, the sequence of encoded binary digits are divided to a plurality of blocks, each of which is formed with a predetermined number of the encoded binary digits, and a selected redundant code consisting of plural binary digits is inserted between each successive two blocks. The sequence of encoded binary digits containing the selected redundant codes added thereto produces the recording signal with the waveform which has the long minimum run length and does not contain the DC component or contains the diminished DC component, when it is modulated in the NRZI modulation.

Other objects, advantages and features of the present invention will become apparent from the following description taken in conjuction with the accompanying drawings.

DESCRIPTION OF THE PREFERRED EMBODIMENT

Figures 1, 2:
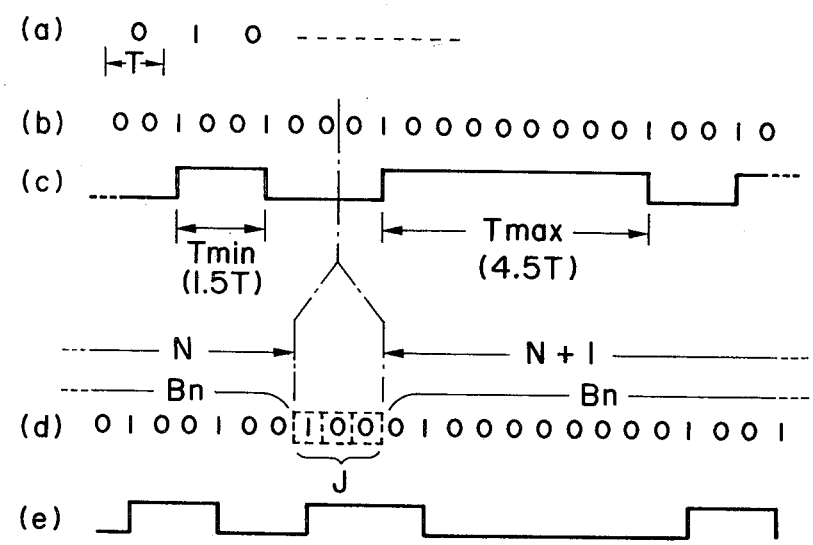
FIG. 1 is an illustration showing a sequence of data binary digits, a couple of sequences of encoded binary digits and a couple of waveforms used for explanation of the fundamental concept of the present invention.
FIG. 2 is a table showing the relation of a redundant code to encoded binary digits (bits) used for explanation of the fundamental concept of the present invention.

First the fundamental concept of the present invention will be explained. In this invention, when binary data having a cycle of binary digits (bits) represented as T, as shown with (a) in FIG. 1, is encoded, each three digits of the binary data are treated as a unit and converted to six encoded binary digits so as to produce a sequence of encoded binary digits shown with (b) in FIG. 1. This sequence of encoded binary digits shown with (b) in FIG. 1 is a mere example. A recording signal having the waveform shown with (c) in FIG. 1 is obtained by modulating the sequence of encoded binary digits shown with (b) in FIG. 1 in the NRZI modulation, wherein the minimum run length·Tmin is 1.5 T and the maximum run length·Tmax is 4.5 T. This means that in the sequence of encoded binary digits shown with (b) in FIG. 1, the minimum interval between successive two binary digits of "1" is three digit periods and therefore there are at least two binary digits of "0" between one binary digit of "1" and the next binary digit of "1", and the maximum interval between successive two binary digits of "1" is nine digit periods and therefore there are some binary digits of "0" less than nine between one binary digit of "1" and the next binary digit of "1". This minimum run length·Tmin of 1.5 T is desirable one, however the waveform of the recording signal shown with (c) in FIG. 1 contains the DC component.

In accordance with the present invention, the sequence of encoded binary digits shown with (b) in FIG. 1 is obtained in the form of a sequence of blocks, each of which is represented as Bn as shown with (d) in FIG. 1 and consists of n digits, with an interval corresponding to three digit periods between each successive two blocks. Between such each successive two blocks, in general, between the Nth (N is a integer) block and the N+1th block, namely, the next block, a redundant code J consisting of three redundant binary digits is inserted. This redundant code J is inserted for the main purpose of omittimg or diminishing the DC component in the waveform of the recording signal. Accordingly, for example, in case that if the level inversion in the waveform of the recording signal does not arise between the positions corresponding to the Nth block and the N+1th block respectively, the waveform of the recording signal is to contain the DC component, such as shown with (c) in FIG. 1, the redundant code J is inserted in order to cause the level inversion in the waveform of the recording signal between the positions corresponding to the Nth block and the N+1th block respectively so that the DC component is omitted or so diminished. However, there is such a situation that the level inversion in the waveform of the recording signal is not desired to arise between the positions corresponding to the Nth block and the N+1th block respectively, that is, the level inversion provides with the DC component to the waveform of the recording signal, and in this case the redundant code J inserted between the Nth block and the N+1th block must not cause the level inversion in the waveform of the recording signal. Consequently, the redundant code J is so selected as to include the binary digit of "1" when the level inversion in the waveform of the recording signal is required and as not to include the binary digit of "1" when the level inversion in the waveform of the recording signal is not required.

Further, the redundant code J is so selected that the minimum run length·Tmin is not varied with the insertion thereof. For example, in this embodiment since the minimum run length·Tmin is 1.5 T and therefore there are at least two binary digits of "0" between successive two binary digits of "1", the redundant code J is so selected that there are always at least two binary digits of "0" between successive two binary digits of "1" after it is inserted. For realizing this, the contents of the redundant code J are determined in accordance with the situation of the last two digits in the Nth block. FIG. 2 shows the selection of the redundant code.

Now, supposing that it is required to cause the level inversion in the waveform of the recording signal between the positions corresponding to the Nth block and the N+1th block respectively, since the last two digits in the Nth block, namely, two digits F to be placed in just advanced of the redundant code J after the insertion thereof can be 0 00, 1 or 1 0, the redundant code J is arranged to be 1 0 0 when the advanced two digits F are 0 0, to be 0 0 1 when the advanced two digits F are 0 1 and to be 0 1 0 when the advanced two digits F are 1 0. As a result of this, there are always at least two binary digits of "0" between successive two binary digits of "1" at the boundary between the advanced two digits F and the redundant code J and the boundary between the redundant code J and the digits in the N+1th block, and moreover the level inversion in the waveform of the recording signal arises at the position corresponding to the binary digit of "1" contained in the redundant code J. On the contrary, supposing that it is not required to cause the level inversion in the waveform of the recording signal between the positions corresponding to the Nth block and the N+1th block respectively, the redundant code J is arranged to be 0 0 0 always regardless of the situation of the advanced two digits F, because the redundant code J must not include the binary digit of "1". With the insertion of such a redundant code J as selected as mentioned above, it is accomplished to keep the minimum run length·Tmin in 1.5 T and to cause the level inversion in the waveform of the recording signal which is required between the positions corresponding to the Nth block and the N+1th block respectively. This results in that the DC component in the waveform of the recording signal can be eliminated or so diminished.

One example of the apparatus for encoding binary data according to the present invention, in which the dividing of the encoded binary digits to the blocks each of which consists of n digits, the decision on the matter whether the level inversion in the waveform of the recording signal is necessary or not, the selection of the redundant code, the insertion of the selected redundant code and so on as mentioned above are made, is shown in FIG. 3.

Figure 3:
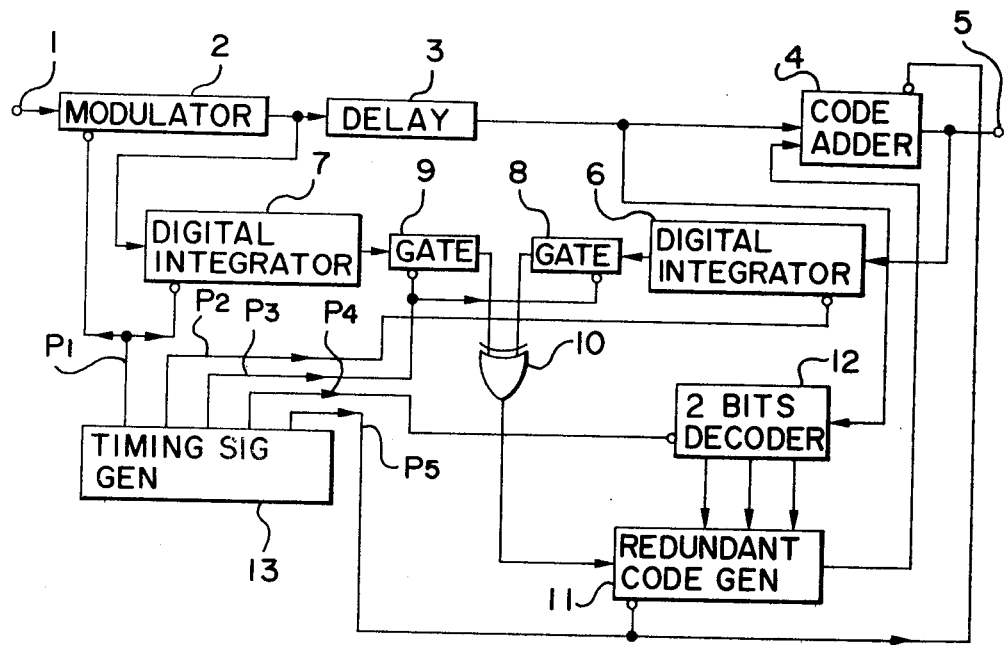
FIG. 3 is a block diagram showing one embodiment of an apparatus for encoding binary data according to the present invention.

In FIG. 3, 1 represents an input terminal to which the binary data as shown with (a) in FIG. 1 is supplied. 2 represents a modulator in which each three digits of the binary data supplied to the input terminal 1 are treated as an unit and converted to six encoded binary digits to produce the sequence of encoded binary digits. The sequence of encoded binary digits is derived from the modulator 2 in the form of the sequence of blocks, each of which consists of n digits, as shown with (d) in FIG. 1. Between each blocks, a time interval (redundant code insertion interval) $T_j$ where the redundant code J eill be inserted later is provided. The sequence of blocks is delayed by a delay circuit 3. The delay time by the delay circuit 3 is selected to correspond to the sum of the period of n digits in the sequence of encoded binary digits and the reduntant code insertion interval $T_j$. The output of the delay circuit 3 is supplied to one input terminal of a code adder 4. The code adder 4 is supplied with also the reduntant code J from other input terminal thereof and inserts the redundant code J between each successive two blocks in the output from the delay circuit 3 to produce the final sequence of encoded binary digits. The sequence of encoded binary digits obtained hereat is derived from an output terminal 5 to be modulated in the NRZI modulation. 6 represents a first digital integrator which counts +1 (or −1) when one binary digit of "1" is supplied and continues to count +1 (or *1) at every digit and accumulates them nutil the next binary digit of "1" is supplied, and when the next binary digit of "1" comes, which continues to count −1 (or +1) and accumulates them until the further next binary digit of "1" is supplied. This operation in the first digital integrator 6 is done repeatedly. To such a first digital integrator 6, the sequence of encoded binary digits from the output terminal of the code adder 4 is supplied and the digital accumulation is performed continuously therein.

Further, 7 represents a second digital integrator which is formed to perform the digital accumulation similar to the digital accumulation performed in the first digital integrator 6 and, in addition, to clear the accumulated result between the arrived digit of the number n and the arrived digit of the number n+1. In other words, the second digital integrator 7 starts to a new digital accumulation at every arrived digit of the number n+1. To this second digital integrator 7, the output of the modulator 2 is supplied and the digital accumulation is done in every block in the sequence of encoded binary digits.

When the result of digital accumulation up to the end of the Nth block in the output of the code adder 4 is obtained in the first digital integrator 6, the result of digital accumulation in the N+1th block in the output of the modulator 2 is obtained in the second digital integrator 7. These results of digital accumulations are supplied to a gate 8 and a gate 9, respectively. Both gate 8 and 9 become ON at a time point to at the end of the Nth block in the output of the code adder 4, namely, the end of the N+1th block in the output of the modulator 2 to derive the results of digital accumulations obtained in the first and second digital integrators 6 and 7, respectively, in the form of "1" when they are positive or in the form of "0" when they are negative, and supply them to an exclusive OR circuit 10. Accordingly, the output of the exclusive OR circuit 10 becomes "0" when both of the results of digital accumulations in the first and second digital integrators 6 and 7 at the time point $t_o$ are positive or negative, and becomes "1" when one of them is positive and the other of them is negative. The fact that both of the results of digital accumulations in the first and second digital integrator 6 and 7 at the time point $t_o$ are positive or negative means that the waveform of the recording signal produced up to the Nth block in the output of the code adder 4 contains the DC component in the positive or negative polarity and the waveform of the recording signal produced in only the N+1th block contains also the DC component in the same polarity, and therefore if the waveform of the recording signal produced in the N+1th block is added to the waveform of the recording signal produced up to the Nth block without the level inversion, the DC component in the waveform of the recording signal increases. In this case, the DC component can be cancelled to decrease by adding the waveform of the recording signal produced in the N+1th block after the level inversion is provided thereto. That is, the level inversion in the waveform of the recording signal is required between the positions corresponding to the Nth block and the N+1th block respectively. While the fact that one of the results of digital accumulations in the first and second digital integrator 6 and 7 at the time point $t_o$ is positive and the other of them is negative means that the DC components contained in the waveform of the recording signal produced up to the Nth block and the waveform of the recording signal produced in only the N+1th block, respectively, are opposit in polarity to each other, and therefore if the waveform of the recording signal produced in the N+1th block is added to the waveform of the recording signal produced up to the Nth block without the level inversion, the DC component in the recoring signal is cancelled to decrease. That is, the level inversion in the waveform of the recording signal is not required between the positions corresponding to the Nth block and the N+1th block respectively. Consequently, the output of the exclusive OR circuit 10 indicates with "0" that the level inversion in the waneform of the recording signal is required between the positions corresponding to the Nth block and the N+1th block respectively and indicates also with "1" that the level inversion in the waveform of the recording signal in not required between the positions corresponding to the Nth block and the N+1th block.

In view of the above, it is understood that the first and second digital integrators 6 and 7, the gates 8 and 9, and the exclusive OR circuit 10 form a circuit for judging whether the level inversion is required or not. The output of the exclusive OR circuit 10 is supplied to a redundant code generator 11 at the time point $t_o$.

The output of the delay circuit 3 is also supplied to a two binary digits (2 bits) decoder 12. The two binary digits decoder 12 generates an output in the form of two digits of 0 0, 0 1 or 1 0 according to the last two digits in the Nth block, namely, the advanced two digits F in the output of the delay circuit 3 and supplies it to the redundant code generator 11. The redundant code generator 1 holds the output of the two binary digits decoder 12 and generates four kinds of sequences of three binary digits 1 0 0, 0 0 1, 0 1 0 and 0 0 0 to supply selectively to the code adder 4. In the redundant code generator 11, the operation expressed by the logical equation $I = A \cdot H + \overline{A} \cdot (B \cdot H + C \cdot F + D \cdot G)$, wherein A is the output of "1" of the exclusive OR circuit 10, $\overline{A}$ is the output of "0" of the exclucive OR circuit 10, B, C and D are the outputs of 0 0, 0 1 and 1 0 of the two binary digits decorder 12, respectively, E, F, G and H are the sequences of three binary digits 1 0 0, 0 0 1, 0 1 0 and 0 0 0 generated in the redundant code generator 11, respectively, and I is the output of the redundant code generator 11, is performed. As a result of this, the redundant code J selected as shown on the table in FIG. 2 is generated to be supplied to the code adder 4 and inserted between the Nth block and the N+1th block in the output of the delay circuit 3 at the code adder 4.

Figure 4:
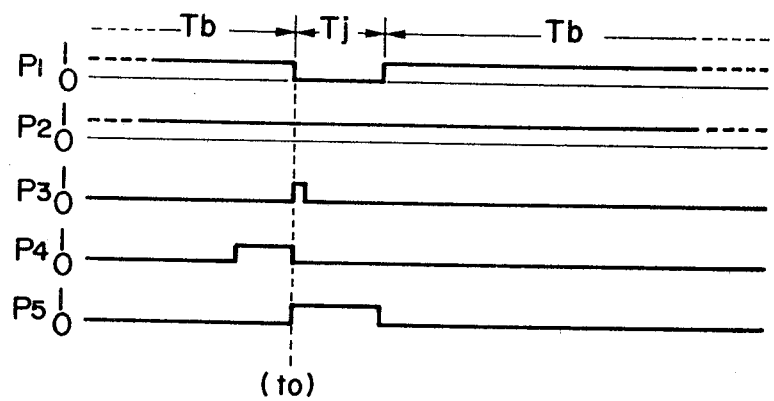
FIG. 4 is a illustration showing the waveforms of timing signals used in the apparatus shown in FIG. 3.

13 represents a timing signal generator for controlling each of the above ventioned circuits, which generates five kinds of timing signals $P_1$, $P_2$, $P_3$, $P_4$ and $P_5$ as shown in FIG. 4. For example, the timing signal $P_1$ takes "0" between each blocks in the output of the modulator 2, namely, at the redundant code insertion interval $T_j$ and takes "1" at the interval $T_b$ of each of the blocks, the timing signal $P_2$ takes "1" always, the timing signal $P_3$ is a narrow pulse rising up to "1" at the front edge of the redundant code insertion interval $T_j$, the timing signal $P_4$ takes "1" at the period of the last two digits in each of the blocks, namely, the advanced two digits F and takes "0" during other intervals and the timing signal $P_5$ takes "1" at the redundant code inserting interval $T_j$ and takes "0" at the interval $T_b$ of each of the blocks, and when each of these timing signals takes "1", each of the above mentioned circuits conducts a predetermined operation. The timing signals $P_1$, $P_2$, $P_3$, $P_4$ and $P_5$ are supplied to the modulator 2 and the second digital integrator 7, to the first digital integrator 6, to the gate 8 and 9, to the two binary digits decoder 12 and to the code adder 4 and the redundant code generator 11, respectively. The code adder 4 is arranged to transmit the output of the delay circuit 3 to the output 5 therethrough when the timing signal $P_5$ supplied thereto takes "0" and to transmit the redundant code J supplied thereto from the redundant code generator 11 to the output 5 when the timing signal $P_5$ takes "1".

As apparent from the above description, according to the method and apparatus of the present invention, by means of adding the selected redundant code to the encoded binary digits, the sequence of encoded binary digits which can produce the recording signal with the waveform which has the long minimum run length and does not contain the DC component or contains the diminished DC component, when it is modulated in the NRZI modulation, can be obtained. In the information recording with such a recording signal, errors in conversion of a reproduced signal to a binary digit signal can be avoided so that the high data density recording can be achieved, and further the recording signal can be free from distortions in its waveform caused by the AC coupling elements. The redundant code should be finally eliminated in the reproducing process to reproduce the original binary data.

In the embodiment disclosed above, although the minimum run length·Tmin is not varied by the adding of the redundant code consisting of three digits, it is possible for the maximum run length·Tmax to elongate by less than four digits. In view of this, the redundant code may be formed with, for example, six digits which are selected in response to the contents of both blocks between which the redundant code is inserted so that both of the minimum run length·Tmin and the maximum run length·Tmax are not varied by the adding of the redundant code.

What is claimed is:

1. A method for encoding binary data to produce a sequence of encoded binary digits to be modulated in the NRZI modulation, comprising the steps of:

encoding the binary data to produce encoded binary digits; arranging said encoded binary digits to form a sequence of binary digit blocks, each of which consists of a plurality of encoded binary digits, with an interval corresponding to a predetermined number of binary digits between each successive two of said binary digit blocks; and inserting a redundant code consisting of said predetermined number of binary digits in said interval in the sequence of binary digit blocks to produce said sequence of encoded binary digits, said redundant code being so selected that the minimum run length in the waveform of a signal obtained by modulating said sequence of encoded binary digits in the NRZI modulation is not reduced compared with the minimum run length in the waveform of a signal obtained by modulating in the NRZI modulation the encoded binary digits without the redundant code and the DC component in the waveform of the signal obtained by modulating said sequence of encoded binary digits in the NRZI modulation is eliminated or diminished when it is inserted in said interval.

2. An apparatus for encoding binary data to produce a sequence of encoded binary digits to be modulated in the NRZI modulation, comprising:

modulating means for encoding the binary data to produce encoded binary digits and arranging said encoded binary digits to form a sequence of binary digit blocks, each of which consists of a plurality of encoded binary digits, with an interval corresponding to a predetermined number of binary digits between each successive two of said binary digit blocks;

redundant code generating means being able to produce various redundant codes, each of which consists of said predetermined number of binary digits, and providing with one of said various redundant codes, which is to be inserted in said interval in the sequence of binary digit blocks, said one of the various redundant codes being so selected as not to reduce the minimum run length in the waveform of a signal obtained by modulating in the NRZI modulation said sequence of binary digit blocks with said one of various redundant codes inserted therein in comparison with the minimum run length in the waveform of a signal obtained by modulating in the NRZI modulation the encoded binary digits without the redundant code; and adding means for inserting said one of the various redundant codes in said interval in the sequence of binary digit blocks to produce said sequence of encoded binary digits, by which the DC component in the waveform of a signal obtained by modulating said sequence of encoded binary digits in the NRZI modulation is elminated or diminished.

* * * * *